(12) United States Patent
Lindeman

(10) Patent No.: US 9,905,052 B2
(45) Date of Patent: Feb. 27, 2018

(54) SYSTEM AND METHOD FOR CONTROLLING IMMERSIVENESS OF HEAD-WORN DISPLAYS

(71) Applicant: Worcester Polytechnic Institute, Worcester, MA (US)

(72) Inventor: Robert W. Lindeman, Concord, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 101 days.

(21) Appl. No.: 14/988,286

(22) Filed: Jan. 5, 2016

(65) Prior Publication Data

US 2016/0196694 A1    Jul. 7, 2016

Related U.S. Application Data

(60) Provisional application No. 62/106,775, filed on Jan. 23, 2015, provisional application No. 62/099,925, filed on Jan. 5, 2015.

(51) Int. Cl.
| | |
|---|---|
| *G06T 19/00* | (2011.01) |
| *A63F 13/25* | (2014.01) |
| *A63F 13/213* | (2014.01) |
| *A63F 13/2145* | (2014.01) |
| *G06F 3/147* | (2006.01) |

(Continued)

(52) U.S. Cl.
CPC .......... *G06T 19/006* (2013.01); *A63F 13/213* (2014.09); *A63F 13/2145* (2014.09); *A63F 13/25* (2014.09); *G02B 27/0172* (2013.01); *G02B 27/0176* (2013.01); *G06F 1/163* (2013.01); *G06F 3/011* (2013.01); *G06F 3/147* (2013.01); *A63F 2300/6653* (2013.01); *A63F 2300/8082* (2013.01);

(Continued)

(58) Field of Classification Search
None
See application file for complete search history.

(56) References Cited

U.S. PATENT DOCUMENTS 9,122,053 B2 * 9/2015 Geisner ............... G02B 27/017
9,158,115 B1 * 10/2015 Worley ............ G02B 27/0172
(Continued)

FOREIGN PATENT DOCUMENTS

WO    WO-2013/066521 A1    5/2013

OTHER PUBLICATIONS

International Search Report and Written Opinion dated Jul. 19, 2016, in International application No. PCT/US2016/012195, filed Jan. 5, 2016, 18 pages.

*Primary Examiner* — Tize Ma
(74) *Attorney, Agent, or Firm* — Wolf, Greenfield & Sacks, P.C.

(57) ABSTRACT

Systems and methods are provided for controlling immersiveness of head-worn displays. A virtual-reality headset includes at least one panel on the virtual reality headset that is capable of being adjusted to increase or decrease opacity of the panel. A control device in communication with the at least one panel is capable of adjusting the opacity of the at least one panel in response to a command to increase or decrease the opacity of the panel so that a system user's immersiveness in the virtual world displayed by the virtual-reality headset is capable of being automatically controlled while the system user wears the virtual-reality headset.

16 Claims, 15 Drawing Sheets

(51) Int. Cl.
   *G06F 1/16*    (2006.01)
   *G06F 3/01*    (2006.01)
   *G02B 27/01*   (2006.01)

(52) U.S. Cl.
   CPC .................. *G02B 2027/014* (2013.01); *G02B 2027/0138* (2013.01); *G02B 2027/0178* (2013.01)

(56) References Cited

U.S. PATENT DOCUMENTS

| | | | |
|---|---|---|---|
| 2009/0237492 A1 | 9/2009 | Kikinis et al. | |
| 2012/0050141 A1* | 3/2012 | Border | G02B 27/017 345/8 |
| 2012/0068913 A1* | 3/2012 | Bar-Zeev | G02B 26/026 345/8 |
| 2012/0127284 A1* | 5/2012 | Bar-Zeev | G02B 27/017 348/53 |
| 2013/0113973 A1* | 5/2013 | Miao | G09G 3/003 348/333.01 |
| 2014/0266986 A1* | 9/2014 | Magyari | G02B 27/0172 345/8 |
| 2014/0375679 A1* | 12/2014 | Margolis | G09G 3/3208 345/633 |
| 2015/0145985 A1* | 5/2015 | Gourlay | G06T 17/00 348/135 |

\* cited by examiner

SYSTEM AND METHOD FOR CONTROLLING IMMERSIVENESS OF HEAD-WORN DISPLAYS

CROSS-REFERENCE TO RELATED APPLICATIONS

This application claims the benefit under 35 U.S.C. § 119(e) of Provisional Application No. 62/099,925, filed Jan. 5, 2015, entitled "System and Method for Controlling Immersiveness of Head-Worn Displays" and Provisional Application No. 62/106,775, filed Jan. 23, 2015, entitled "System and Method for Improved Virtual Reality Headsets," the entire contents of which are incorporated by reference here in their entirety.

TECHNICAL FIELD

Disclosed apparatus, systems, and computerized methods relate generally to controlling immersiveness of head-worn displays.

BACKGROUND

Present day virtual reality (VR) headsets are designed to provide an immersive experience for video games, simulations, etc., by displaying stereo images to the user's eyes in order to provide the user with a seemingly real experience. VR headsets are typically worn over a user's eyes and are designed to physically block out the real world using "blinders" on the sides and top of the VR headset, similar in concept to a pair of ski goggles, occluding the peripheral vision, and focusing the wearer's attention on the view straight ahead, namely the computer-generated VR world. The blinders can be made of various materials, such as plastic, metal, rubber, and/or the like. That way, the user's vision is focused only on the stereo images for a more realistic experience.

FIGS. 1A-1C illustrate exemplary VR headsets. FIG. 1A shows the Oculus Rift VR headset 100, FIG. 1B shows the Sony Morpheus VR headset 110, and FIG. 1C shows the Samsung Gear VR headset 120. Each VR headset 100, 110 and 120 includes a blinder 102 to occlude the peripheral vision of the wearer. Such blinders help to provide the wearer with a deep level of immersion into the virtual world.

While using blinders on VR headsets is good for the experience (e.g., gaming experience), such blinders preclude the user from performing simple tasks, such as seeing a nearby keyboard, mouse and/or game controller, or other real-world objects such as their coffee mug on a nearby table, or other people in the same room. As another example, it is often difficult for VR headset users to access and interact with menus being displayed on real-world objects (e.g., such as tablets, computer screens, televisions, and/or the like). Simple desktop selection actions, such as choosing a file to open, selecting a texture to apply, or picking an object from an inventory, become very difficult to do with any sort of precision. Therefore one side effect of the occlusive nature of these and other VR headsets is that the wearer is situated in the real world (e.g., at a desk) of which they have very little, or no, awareness.

Additionally, with some VR experiences (e.g., experiences with movement), the user may lose their real-world frame of reference, and therefore VR headsets can cause motion sickness. Such motion sickness can be exacerbated when the user cannot perceive the real world.

SUMMARY

In accordance with the disclosed subject matter, systems, methods, and non-transitory computer-readable media are provided for controlling the immersiveness of a head-worn display.

The disclosed subject matter includes a virtual-reality headset. The virtual-reality headset includes at least one panel on the virtual reality headset, with the at least one panel being capable of being adjusted to increase or decrease opacity of the panel. The virtual-reality headset includes a control device in communication with the at least one panel, with the control device being capable of adjusting the opacity of the at least one panel in response to a command to increase or decrease the opacity of the panel, and with the control device including at least one of a computer-based control device or an electrical control device, whereby a system user's immersiveness in the virtual world displayed by the virtual-reality headset is capable of being automatically controlled while the system user wears the virtual-reality headset.

In some examples, the at least one panel is disposed on a front of the virtual-reality headset, such that the opacity of the panel can be controlled to allow the system user to see the real world when the user is wearing the virtual-reality headset. The at least one panel can include a first panel disposed on a first side of the virtual-reality headset and a second panel disposed on a second side of the virtual-reality headset. Each of the first and second panels can be controlled individually, simultaneously, or any combination thereof.

In some examples, the at least one panel is a liquid crystal display panel that can be adjusted to control the opacity of the panel. The control device can be disposed on the virtual reality headset so that the system user can manually adjust the opacity of the at least one panel. The control device can be a computing device located remote from the virtual-reality headset so that the control device can automatically control the headset based on one or more preconfigured triggers.

The disclosed subject matter can include a computerized method for controlling a system user's immersiveness in a virtual world displayed by a virtual-reality headset. The computerized method can be stored in machine-readable instructions that, when executed by a processor, cause the processor to receive an instruction to adjust the opacity of at least one panel on the virtual reality headset, the at least one panel being capable of being adjusted to increase or decrease opacity of the panel, and to adjust the opacity of the at least one panel in response to the instruction, whereby the system user's immersiveness in the virtual world displayed by the virtual-reality headset is automatically controlled while the system user wears the virtual-reality headset.

In some examples, the instruction includes an instruction to increase the opacity of the at least one panel, an instruction to decrease the opacity of the at least one panel, or both, and adjusting the opacity of the at least one panel comprises increasing the opacity of the at least one panel, decreasing the opacity of the at least one panel, or both, in response to the instruction. The instruction can be received from a computing device located remote from the virtual-reality headset so that the control device can automatically control the headset based on one or more preconfigured triggers. The instruction can be received from a control device disposed on the virtual reality headset so that the system user can manually adjust the opacity of the at least one panel.

In some examples, the at least one panel is disposed on a front of the virtual reality headset, and adjusting the opacity of the at least one panel includes adjusting a front of the virtual-reality headset to control the opacity of the front of the virtual-reality headset to allow the system user to see the real world when the user is wearing the virtual-reality headset. The at least one panel can include a first panel disposed on a first side of the virtual-reality headset and a second panel disposed on a second side of the virtual-reality headset, and adjusting the opacity of the at least one panel can include controlling each of the first and second panels individually, simultaneously, or any combination thereof.

The disclosed subject matter can include a non-transitory computer readable medium. The non-transitory computer readable medium has executable instructions operable to cause an apparatus to receive an instruction to adjust the opacity of at least one panel on a virtual-reality headset, the at least one panel being capable of being adjusted to increase or decrease opacity of the panel, and to adjust the opacity of the at least one panel in response to the instruction, whereby a system user's immersiveness in a virtual world displayed by the virtual-reality headset is automatically controlled while the system user wears the virtual-reality headset.

In some examples, the instruction includes an instruction to increase the opacity of the at least one panel, an instruction to decrease the opacity of the at least one panel, or both, and adjusting the opacity of the at least one panel includes increasing the opacity of the at least one panel, decreasing the opacity of the at least one panel, or both, in response to the instruction. The instructions can be operable to cause the apparatus to receive the instruction from a computing device located remote from the virtual-reality headset so that the control device can automatically control the headset based on one or more preconfigured triggers. The instructions can be operable to cause the apparatus to receive the instruction from a control device disposed on the virtual reality headset so that the system user can manually adjust the opacity of the at least one panel.

In some examples, the at least one panel is disposed on a front of the virtual reality headset, and adjusting the opacity of the at least one panel includes adjusting a front of the virtual-reality headset to control the opacity of the front of the virtual-reality headset to allow the system user to see the real world when the user is wearing the virtual-reality headset. The at least one panel can include a first panel disposed on a first side of the virtual-reality headset and a second panel disposed on a second side of the virtual-reality headset, and adjusting the opacity of the at least one panel comprises controlling each of the first and second panels individually, simultaneously, or any combination thereof.

The disclosed subject matter includes a computerized method for including at least a portion of a real world view of an environment in which a virtual reality headset is located into a visual virtual world displayed by the virtual reality headset. The computerized method is stored in machine-readable instructions that, when executed by a processor, cause the processor to receive image data from a camera mounted on the virtual reality headset, the image data including real-world images captured by the camera of the environment in which the virtual-reality headset is located, identify at least one physical tool from the image data that a system user of the virtual-reality headset can use to interact with the virtual world displayed by the virtual-reality headset, segment image data for the at least one physical tool from other image data, and display the segmented image data of the at least one physical tool in the virtual world displayed by the virtual-reality headset, with the system user being capable of interacting with the at least one physical tool by viewing the physical tool in the virtual reality headset and interacting with the physical tool without needing to remove the virtual-reality headset.

In some examples, the computerized method includes determining input is needed from the physical tool, and fading in the segmented image data into the virtual world displayed by the virtual-reality headset to make the segmented image data more prominent in the virtual world. The computerized method can include receiving input from the physical tool, determining input is not need from the physical tool, and fading out the segmented image data from the virtual world displayed by the virtual-reality headset to make the segmented image less prominent in the virtual world.

In some examples, the computerized method includes determining the physical tool is moved out of view of the camera, and removing the segmented image data from the virtual world displayed by the virtual-reality headset so that the physical tool is not displayed in the virtual world. The computerized method can include determining the physical tool is moved into view of the camera, and displaying the segmented image data from the virtual world displayed by the virtual-reality headset so that the physical tool is not displayed in the virtual world. A display on the physical tool can be synchronized with the virtual world displayed by the virtual reality headset. Data can be transmitted to the physical tool causing the physical tool to generate a display of the virtual world on the physical tool from a different point of view than a point of view of the virtual world displayed by the virtual-reality headset.

The disclosed subject matter includes a computing apparatus configured to include at least a portion of a real world view of an environment in which a virtual reality headset is located into a visual virtual world displayed by the virtual reality headset. The computing apparatus includes a processor configured to run a module stored in memory that is configured to cause the processor to receive image data from a camera mounted on the virtual reality headset, the image data including real-world images captured by the camera of the environment in which the virtual-reality headset is located, identify at least one physical tool from the image data that a system user of the virtual-reality headset can use to interact with the virtual world displayed by the virtual-reality headset, segment image data for the at least one physical tool from other image data, and display the segmented image data of the at least one physical tool in the virtual world displayed by the virtual-reality headset, with the system user being capable of interacting with the at least one physical tool by viewing the physical tool in the virtual reality headset and interacting with the physical tool without needing to remove the virtual-reality headset.

In some examples, the processor is further configured to determine input is needed from the physical tool, and to fade in the segmented image data into the virtual world displayed by the virtual-reality headset to make the segmented image data more prominent in the virtual world. The processor can be further configured to receive input from the physical tool, determine input is not need from the physical tool, and fade out the segmented image data from the virtual world displayed by the virtual-reality headset to make the segmented image less prominent in the virtual world.

In some examples, the processor is configured to determine the physical tool is moved out of view of the camera, and remove the segmented image data from the virtual world displayed by the virtual-reality headset so that the physical tool is not displayed in the virtual world. The processor can be further configured to determine the physical tool is moved into view of the camera, and display the segmented image data from the virtual world displayed by the virtual-reality headset so that the physical tool is not displayed in the virtual world. The processor can be further configured to synchronize a display on the physical tool with the virtual world displayed by the virtual reality headset. The processor can be further configured to transmit data to the physical tool causing the physical tool to generate a display of the virtual world on the physical tool from a different point of view than a point of view of the virtual world displayed by the virtual-reality headset.

The disclosed subject matter includes a non-transitory computer readable medium. The non-transitory computer readable medium has executable instructions operable to cause an apparatus to receive image data from a camera mounted on the virtual reality headset, the image data including real-world images captured by the camera of the environment in which the virtual-reality headset is located, identify at least one physical tool from the image data that a system user of the virtual-reality headset can use to interact with the virtual world displayed by the virtual-reality headset, segment image data for the at least one physical tool from other image data, and display the segmented image data of the at least one physical tool in the virtual world displayed by the virtual-reality headset, with the system user being capable of interacting with the at least one physical tool by viewing the physical tool in the virtual reality headset and interacting with the physical tool without needing to remove the virtual-reality headset.

In some examples, the executable instructions are operable to cause the apparatus to determine input is needed from the physical tool, and fade in the segmented image data into the virtual world displayed by the virtual-reality headset to make the segmented image data more prominent in the virtual world. The executable instructions can be operable to cause the apparatus to receive input from the physical tool, determine input is not need from the physical tool, and fade out the segmented image data from the virtual world displayed by the virtual-reality headset to make the segmented image less prominent in the virtual world.

In some examples, the executable instructions are operable to cause the apparatus to determine the physical tool is moved out of view of the camera, and remove the segmented image data from the virtual world displayed by the virtual-reality headset so that the physical tool is not displayed in the virtual world. The executable instructions can be operable to cause the apparatus to determine the physical tool is moved into view of the camera, and display the segmented image data from the virtual world displayed by the virtual-reality headset so that the physical tool is not displayed in the virtual world.

In some examples, the executable instructions are operable to cause the apparatus to synchronize a display on the physical tool with the virtual world displayed by the virtual reality headset. The executable instructions can be operable to cause the apparatus to transmit data to the physical tool causing the physical tool to generate a display of the virtual world on the physical tool from a different point of view than a point of view of the virtual world displayed by the virtual-reality headset.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Some approaches allow people to perform common physical actions when "in" the VR world by using, for example, pointing gestures or other physical movements by the user that are captured by sensing equipment (e.g., a Kinect or Leap Motion device), and mapping those gestures to movement commands associated with the virtual world. For example, sensing equipment can be configured to capture a waving motion and to translate that motion into a command for the virtual world (e.g., an open action, a sword swing, and/or the like). However, such approaches do not allow a user to interact with the surrounding physical environment while in the VR experience, because the user cannot see the real world.

To improve the usability of VR equipment, it can be desirable to allow VR users to perform tasks on real-world objects (e.g., smartphones, tablets, computers, video game systems, and/or the like). For example, it may be desirable to allow a VR user to interact with a user interface (e.g., menus, items, and/or the like) that are displayed on a tablet device, such as selecting a texture from a palette displayed on the device. This approach of using real-world objects allows a system user to use his or her familiarity with tablet interaction techniques (e.g., swiping, pinch zoom, text input, and/or the like), as well as the precision afforded by the tangible surface of the object, in order to perform these tasks efficiently.

Figure 1B:
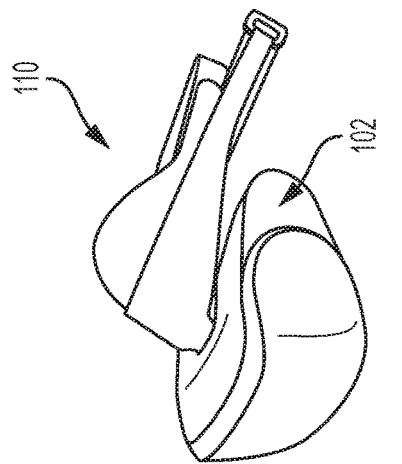
FIGS. 1A-1C illustrate exemplary VR headsets.
Figure 1C:
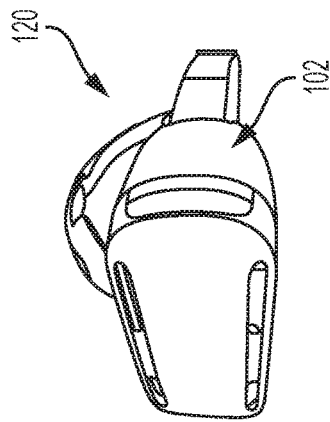
Figure 1A:
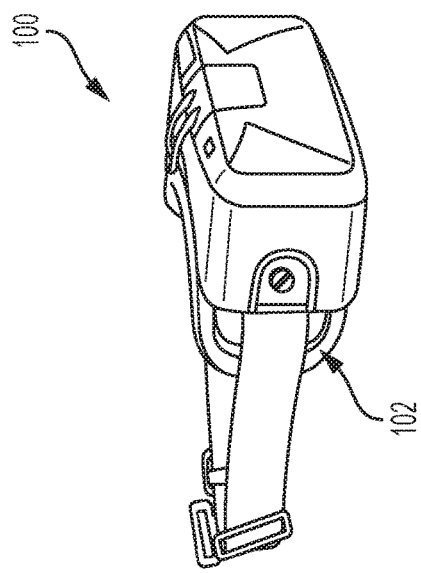
Figure 2C:
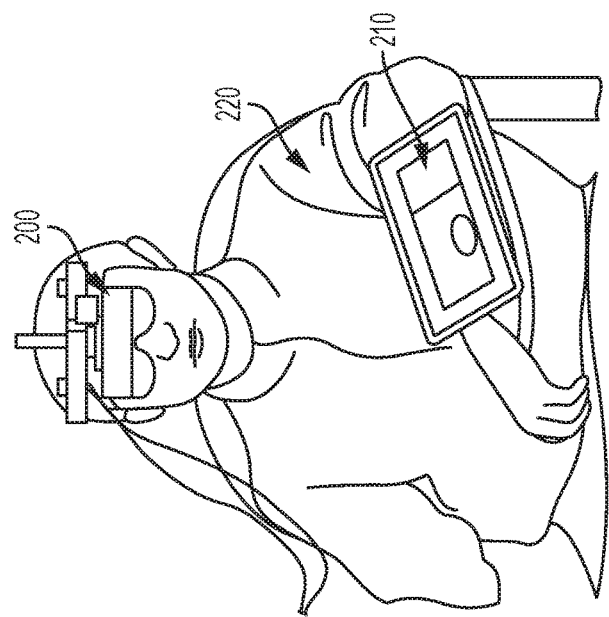
FIGS. 2A-2C illustrate an exemplary technique for allowing a user to perform tasks on real world objects.
Figure 2A:
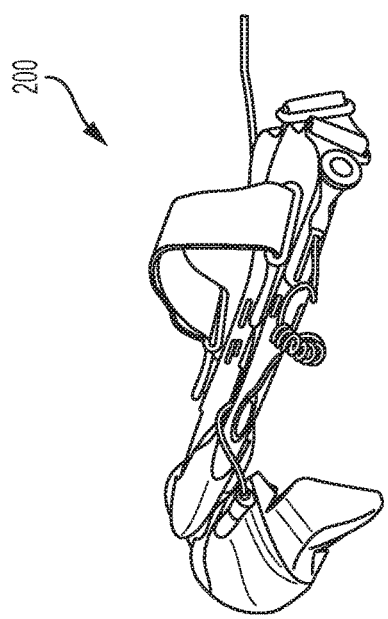
Figure 2B:
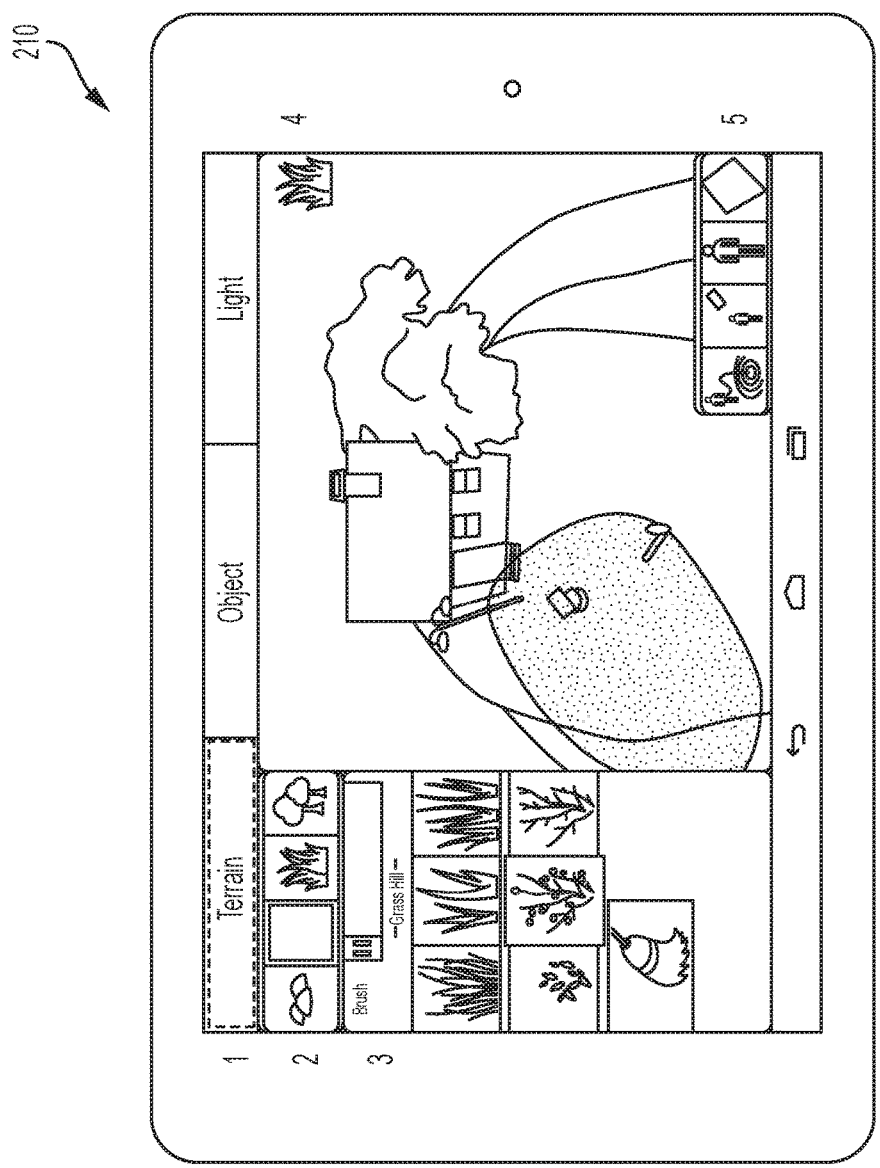

FIGS. 2A-2C illustrate an exemplary technique for allowing a user to perform tasks on real world objects. FIG. 2A shows an exemplary non-occlusive VR headset 200 (e.g., eMagine z800 VR headset). VR headset 200 is non-occlusive because it does not have large blinders, e.g., compared to the blinders 102 on the VR headsets shown in FIGS. 1A-1C. FIG. 2B shows a tablet 210 with a display configured for interaction with a user. Section 1 of FIG. 2B shows a row of buttons the user can tap with his or her finger to select a mode (e.g., Terrain editing). Section 2 shows sub-items (e.g., grass, trees) of a given mode, and section 3 shows more details (e.g., types of grass) that the user can use to "paint" on the overhead view of the virtual world shown in section 4. Section 5 shows some shortcut buttons. FIG. 2C shows a user operating according to the hybrid interaction approach by using the VR headset 200 as well as having the tablet 210 nearby so that the user can perform operations on the tablet while wearing the VR headset 200 (since the VR headset 200 is non-occlusive). However, applying such a hybrid approach with a secondary device (e.g., a tablet) to other types of VR headsets (e.g., such as those shown in FIGS. 1A-1C), is often not feasible because the system user cannot see the device without removing the headset due to the blinder configuration.

The techniques described herein permit the system to bring a real view of the physical device into the virtual world, supporting the rich, familiar tablet interaction methods within the virtual world itself. In some embodiments, a mixed-reality approach can be used to bring a device, such as a device with a digital interactive display surface (e.g., smart phone, tablet, watch, and/or the like), into an immersive head-mounted display (HMD) environment, to enable rich and efficient user interaction in the immersive virtual reality.

Figure 3:
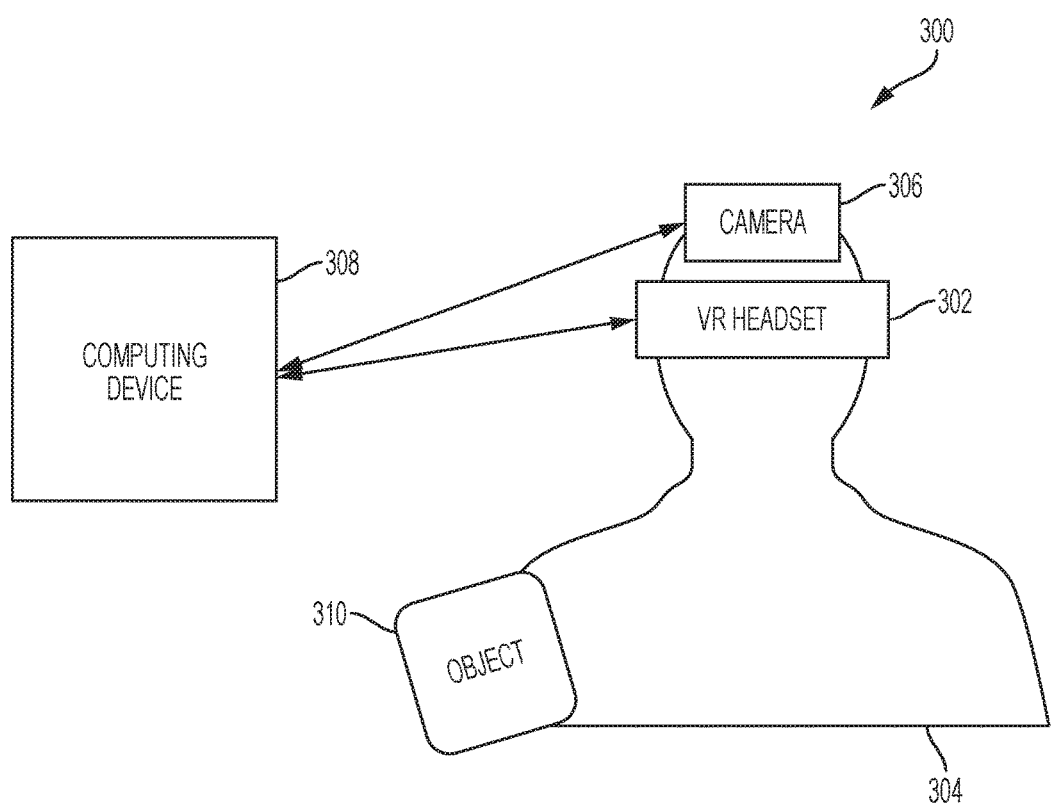
FIG. 3 illustrates an exemplary system for introducing real-world objects into a virtual world, according to some embodiments.

FIG. 3 illustrates an exemplary system 300 for introducing real-world objects into a virtual world, according to some embodiments. The system 300 includes a VR headset 302 that is worn by the user 304. The system also includes a camera 306, which can be mounted on the VR headset 302, or disposed elsewhere (e.g., fixedly mounted to a desk, mounted to the computing device 308, mounted to the object 310, and/or the like). The system 300 also includes the computing device 308 that is in communication with the VR headset 302 and the camera 306 in this exemplary embodiment, but one of skill in the art can appreciate that other configurations can be used instead (e.g., the camera 306 communicates with the computing device 308 through the VR headset 302). The system 300 also includes a real-world object 310.

The VR headset 302 can be, for example, one or more of the VR headsets shown in FIGS. 1A-1C, or any other VR headset, such as an occlusive VR headset. The camera 306 can be, for example, head-mounted camera can be a camera (e.g., a web camera, a depth camera, a fish-eye camera, and/or the like) that is physically mounted on the VR headset 302 in a fixed position. The camera can be used for real world image acquisition. The images from the head-mounted camera can be processed and used to generate images and pose information of a device in the real world, as explained further herein.

The computing device 308 can be configured to renders immersive views of a virtual world based on the position and orientation of the system user's head (e.g., obtained based on sensors disposed within the VR headset). The virtual world can be, for example, a computer-simulated environment with virtual objects and avatars. In some embodiments, the computing device 308 can be a general-purpose desktop or laptop computer. In some embodiments, the computing device 308 can be a dedicated game console, e.g., PLAYSTATION®3, PLAYSTATION®4, or PLAYSTATION®VITA manufactured by Sony Computer Entertainment, Inc.; WII™, WII U™, NINTENDO 2DS™, or NINTENDO 3DS™ manufactured by Nintendo Co., Ltd.; or XBOX®, XBOX 360®, or XBOX ONE® manufactured by Microsoft Corp. In some embodiments, the computing device 308 can be a server connected to a computer network. In some embodiments, the computing device 308 can be user equipment. The user equipment can communicate with one or more radio access networks and with wired communication networks. The user equipment can be a cellular phone. The user equipment can also be a smartphone providing services such as word processing, web browsing, gaming, and/or the like. The user equipment can also be a tablet computer providing network access and most of the services provided by a smart phone. The user equipment can operate using an operating system such as Symbian OS, iOS, RIM's Blackberry, Windows Mobile, Linux, HP WebOS, and Android. The user equipment may include middleware in the form of a game engine, such as Unity3D, Unreal, and/or the like, or a software API.

The computing device 308 can include a memory, a processor, a video rendering module, a sound synthesizer, a controller interface, and/or the like. The controller interface can couple the computing device 308 with the VR headset 302 and/or the object 310. The memory can take the form of volatile memory, such as Random Access Memory (RAM) or cache memory. In other embodiments, the memory can take the form of non-volatile memory, including by way of example semiconductor memory devices, e.g., EPROM, EEPROM, and flash memory devices; or magnetic disks, e.g., internal hard disks or removable disks. In some embodiments, the memory can include portable data storage devices, including, for example, magneto-optical disks, and CD-ROM and DVD-ROM disks.

The processor can take the form of a programmable microprocessor executing machine-readable instructions, such as a central processing unit (CPU) and/or a graphics processing unit (GPU). Alternatively, the processor can be implemented at least in part by special purpose logic circuitry, e.g., an FPGA (field programmable gate array) or an ASIC (application-specific integrated circuit) or other specialized circuit. The processor can include a plurality of processing units, each of which may independently operate on an input data. In some cases, the plurality of processing units may be configured to perform an identical operation on different data. For example, the plurality of processing units can be configured in a single-instruction-multiple-data (SIMD) architecture to operate on multiple data using a single instruction. In other cases, the plurality of processing units may be configured to perform different operations on different data. For example, the plurality of processing units can be configured in a multiple-instruction-multiple-data (MIMD) architecture to operate on multiple data using multiple instructions.

The memory can store computer programmable instructions configured to carry out the techniques described herein. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The processor can be coupled with a controller interface that can be implemented in hardware to send and receive signals in a variety of mediums, such as optical, copper, and wireless, and in a number of different protocols some of which may be non-transient. The controller can facilitate communication with the camera 306, VR headset 302, and/or object 310.

The real-world object 310 can be, for example, a smart phone, tablet, watch, laptop, touchscreen, and/or the like configured to display a user interface that includes actions that interact with the virtual world that the user 304 perceives through the VR headset 302.

Figure 4:
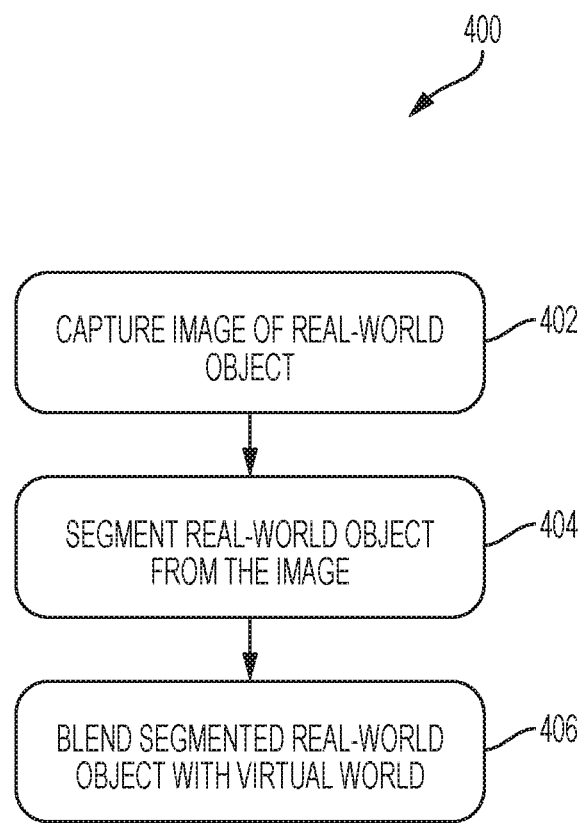
FIG. 4 shows an exemplary computerized method for introducing real-world objects into a virtual world, according to some embodiments.

FIG. 4 shows an exemplary computerized method 400 for introducing real-world objects into a virtual world, according to some embodiments. At step 402, a camera (e.g., camera 306 from FIG. 3) captures an image of a real-world object (e.g., object 310). At step 404, the camera and/or the computing device (e.g., computing device 308) process the captured image to segment the real-world object from the remaining portion of the image. At step 406, the camera and/or the computing device blend the segmented real-world object with the virtual world 406 so that the user can perceive the real-world object through the VR headset. Advantageously the user does not need to remove the VR headset or look at the surrounding real-world in order to perceive the object.

Figure 10:
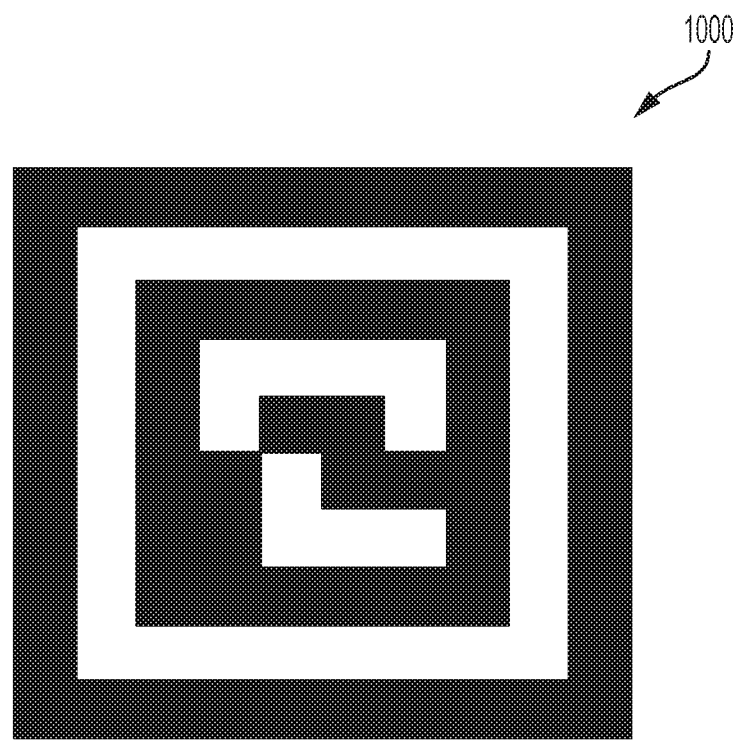
FIG. 10 shows an exemplary visual marker that can be displayed on the tablet, according to some embodiments.

Referring to step 402, the head-mounted camera can continuously capture real world images so that real-time interactions and changes with the object (the tablet, or other tool) can be perceived in the immersive virtual world. Referring to step 404, for each real world image captured by the camera, the techniques can include applying tracking and image processing algorithms to segment out the tablet image, which can then be blended into the image of the virtual world, and displayed on the head mounted display ("HMD"). This way, the user can see both the virtual world and the real world of the object embedded in the virtual world. Techniques for segmenting the image and pose of the object from the camera view may include common vision-based techniques. In some embodiments, the segmentation techniques may include using coordinated visual patterns (digital, analog, and/or hybrid) displayed on the tablet that help in the tablet-tracking process. For example, visual markers used in augmented reality work can be displayed, and/or visual features of the tablet itself can be used for the tablet-tracking process (e.g., the outline of the tablet, buttons on the tablet, and/or the like). FIG. 10 shows an exemplary visual marker 1000 that can be displayed on the tablet, according to some embodiments.

Figure 5:
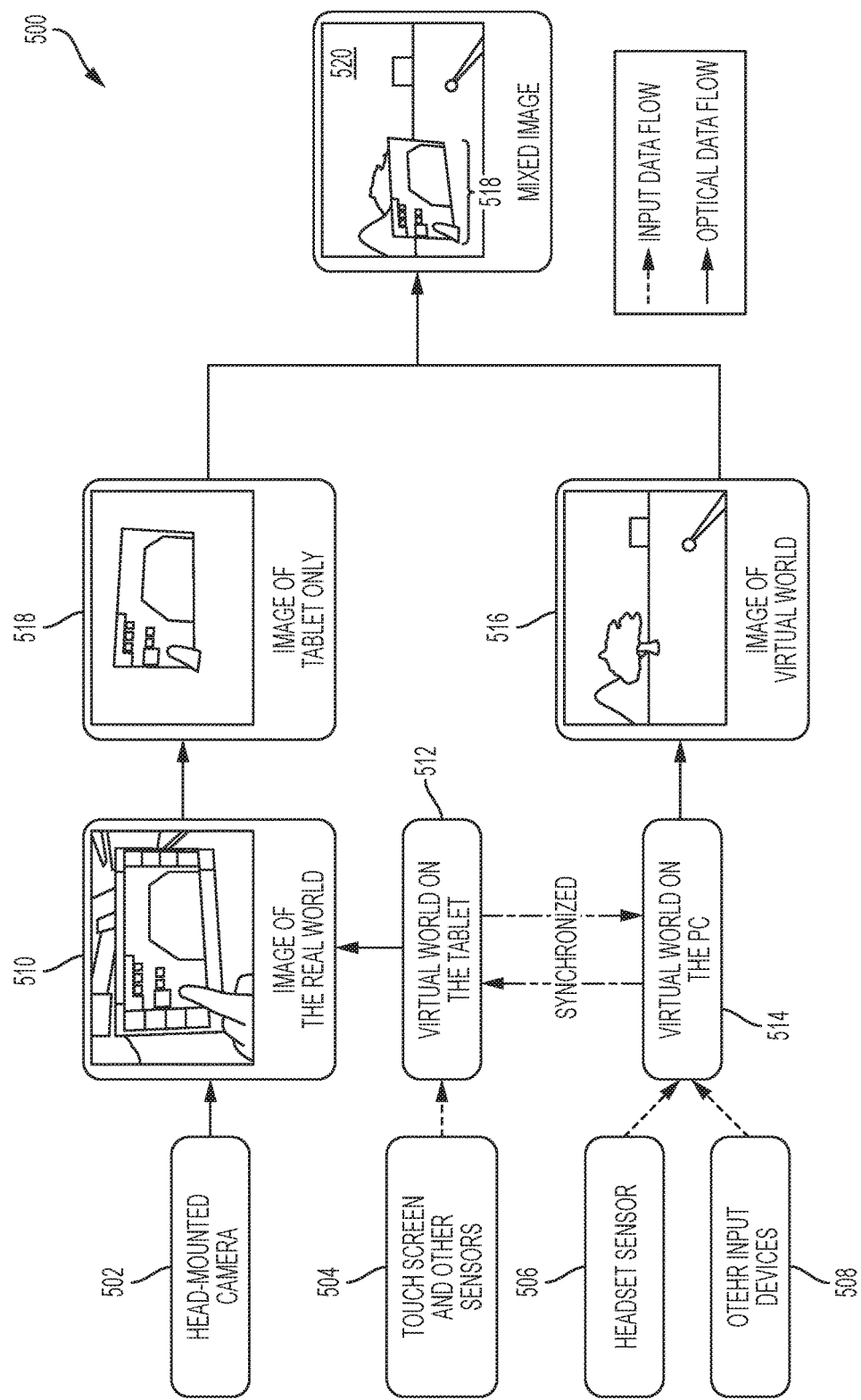
FIG. 5 shows an example of introducing real-world objects into a virtual world, according to some embodiments.

FIG. 5 shows an example 500 of introducing real-world objects into a virtual world, according to some embodiments. The example 500 includes a head-mounted camera 502, such as the camera 306 from FIG. 3. The head-mounted camera can be mounted, for example, to a VR headset. The example 500 also includes a touch screen and/or other sensors 504, such as a tablet. The example 500 also includes one or more headset sensors 506. The sensors 506 can include orientation and/or position sensors, and/or other peripheral equipment, to provide head-motion tracking. The example 500 also includes one or more other input devices 508, such as a keyboard, mouse, game controller, joystick, wand device, data glove, and/or the like. The other input devices 508 can be configured to assist with system user interaction in the immersive virtual world.

The head-mounted camera 502 captures an image of the real world 510. The virtual world shown on the tablet 512 is synchronized with the virtual world on the computing device 514. The image of the virtual world 516 is the virtual world 514 that the user perceives through the VR headset. The image of the real world 510 is processed to segment the image of the tablet 518 from the rest of the image 510. The image of the tablet 518 is then added to the image of the virtual world 516 to create mixed image 520.

As explained herein, the head-mounted camera 502 can be configured to continuously capture images of the real world, e.g., so that the mixed image 520 can be updated at interactive rates. The user can leverage the rich interaction and display capabilities of a digital interactive display device (e.g., smart phone, tablet, smart watch), to aid interaction in the same virtual world. As shown in FIG. 5, the touch screen 504 computes and renders a view of the same virtual world 512 displayed in the HMD 514. In some embodiments, the virtual world on the tablet 512 can be generated from a different point of view than the virtual world of the HMD 514. The table 512 can also include 3D interface elements and/or a 2D graphical user interface (GUI) elements, which can be controlled using multi-touch input or other sensors on the tablet 512. In some embodiments, the virtual environment is simulated on both displays (HMD and tablet) simultaneously, and kept synchronized to give the user a coordinated interaction experience with a unified virtual world.

In some embodiments, in addition to displaying a real-world device, the system can be configured to display all interactions with the device (e.g., via the user's hand, a stylus, and/or the like) in the mixed image 520. The interactions with the device can be shown to the system user in the mixed image 518 so he or she can easily control the device by only looking through the HMD.

During explorations in virtual environments, the techniques described herein allow the system user to accomplish various virtual reality tasks (e.g., navigation, object selection and manipulation, system control, symbolic input, and/or the like) using interfaces in both the immersive and tablet interaction contexts. An interaction context can be a conceptual integration of input and output devices, techniques, and/or parameters, which can offer one representation of the virtual environment and a set of interaction rules. Such a setup can provide the system user with rich interaction capabilities to effectively perform various tasks in immersive 3D spaces.

Therefore, the techniques described herein can be used to bring digital interactive display devices (e.g., smart phone, tablets, smart watches, and/or the like) into virtual environments as a high fidelity interaction tool to support rich and effective interaction in immersive 3D environments. The techniques described herein can be used to treat the interactive display devices as equivalent, first-order computing and interactive contexts to a personal computing device (e.g., such as PC workstation) by rendering different views and interface elements of the same virtual world on both displays, and synchronizing interaction effects between the two contexts.

In some embodiments, manipulations of the image of the real-world object can be applied. For example, when the interface elements on the device are not needed, the device image can be made more transparent in the virtual world, or fade away completely, like drop-down windows on typical desktop systems. When the interface elements on the device are needed again, the device image can fade back into the virtual world, become less transparent, and/or the like.

In some embodiments, the system user may be able to cause the object to disappear from view by moving the object out of the field of view of the camera. In some examples, the (segmented) object image could be docked to the edge of the immersive display, making it view-fixed, rather than fixed to the position and pose of the real-world object (e.g., relative to the VR headset and/or camera). By coordinating the immersive interaction with multi-touch real-world object-based interaction, the system can improve user performance and experience in virtual reality applications.

As described herein, VR headsets are often designed to physically block out the real world using blinders on the sides and top. While occluding the real-world from the user is good for the gaming experience, it can cause motion sickness, create too real of an experience for a user (e.g., when viewing a scary scene or fast-action scene), and/or the like.

The techniques described herein provide for controlling the immersiveness of one or more portions of a VR headset (e.g., how much of the real world a VR headset user can see when wearing the VR headset). The techniques can control the immersiveness by adjusting the transparency of one or more portions of the VR headset. For example, portions of the VR headset, such as the top, bottom, and/or one or more of the sides of the VR headset, can be configured in various configurations that allow for selectively making the real world visible to the user. For example, in a first configuration (e.g., a closed configuration) the real world is blocked out from perception by the user, while in a second configuration (e.g., an open configuration) the user can perceive the real world. In some embodiments, different variations of transparency can be selected for the portions of the VR headset.

Figure 6A:
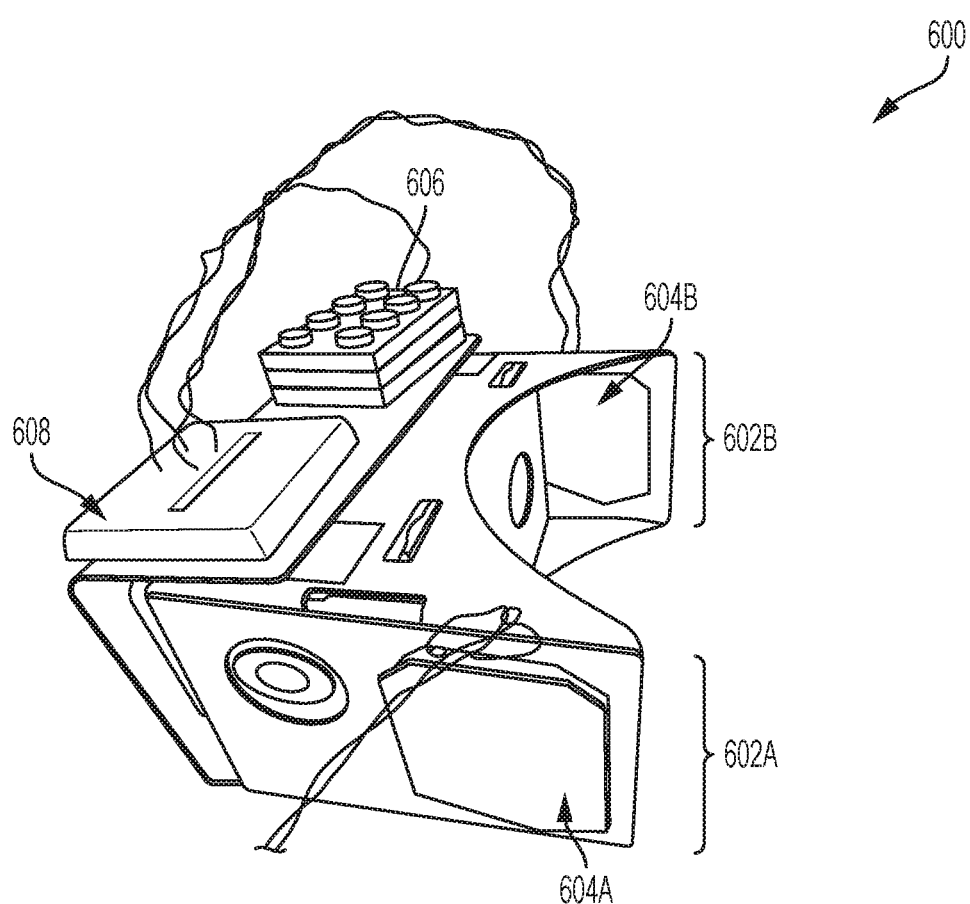
FIGS. 6A-6B illustrate an exemplary VR headset with variably transparent sides, according to some embodiments.

FIG. 6A illustrates an exemplary VR headset 600 with variably transparent sides, according to some embodiments. The VR headset 600 includes blinders 602A and 602B on the sides of the headset, which occlude the side view of the user, as well as portions of the top and bottom view of the user. The VR headset 600 includes panels 604A and 604B (referred to collectively as panels 604) on the sides of the blinders 602A and 602B, respectively. The VR headset 600 includes a controller 606 that is connected to a distribution block 608, which is connected to each of the panels 604A and 604B.

The VR headset 600 is shown with the panels 604 in a transparent configuration, such that the panels 604 allow a user to view the real-world when wearing the VR headset 600. In some embodiments, the panels 604 are Liquid Crystal Display (LCD) panels that can be adjusted to control the amount of light transmitted into HMDs. By adjusting the amount of light transmitted into the HMD, the panels 604 can control the immersiveness. As described herein, the panels 604 can have transparent and non-transparent configurations, as well as other configurations that gradually vary the amount of transparency. For example, rather than changing the panels 604 from non-transparent to transparent, the transparency of the panels 604 can be gradually increased to provide a better user experience.

Referring to the controller 606, the controller 606 is configured to vary the opacity of the panels 604. The controller 606 can be a push button switch with one or more buttons (e.g., where each button is associated with an opacity of the panels 604, such as 100% opacity, 90% opacity, 0% opacity, etc.). In some embodiments, the controller 606 is a slider, a knob, or the like, similar in concept to a slider/knob used for dimmable lights. In some embodiments, the controller 606 is a toggle switch that varies the panels 604 between two different levels of opacity. In some embodiments, in addition to, or in place of, the controller 606, a device located remote from the headset can be configured to adjust the opacity of the panels 604, as described further in conjunction with FIG. 7. One of skill in the art can appreciate that other controllers can be used to adjust the opacity of the panels. In addition, a controller could be accessed using a software API (e.g., a game engine), such that the level of transparency could be controlled by the software application. For example, in order to increase the impact of a cinematic experience, the amount of the real world visible to the user could be controlled by the software. In some examples, a sensor monitoring nausea levels of the user could notify the game engine that the user is getting sick, and more of the real world could be made visible to the user, to thereby help decrease the user's level of nausea. In some embodiments, a combination of physical (e.g., push buttons) and software controlled (e.g., a software API) variation of the transparency could be incorporated into solutions, e.g., to thereby provide both manual and automatic control.

Figure 6B:
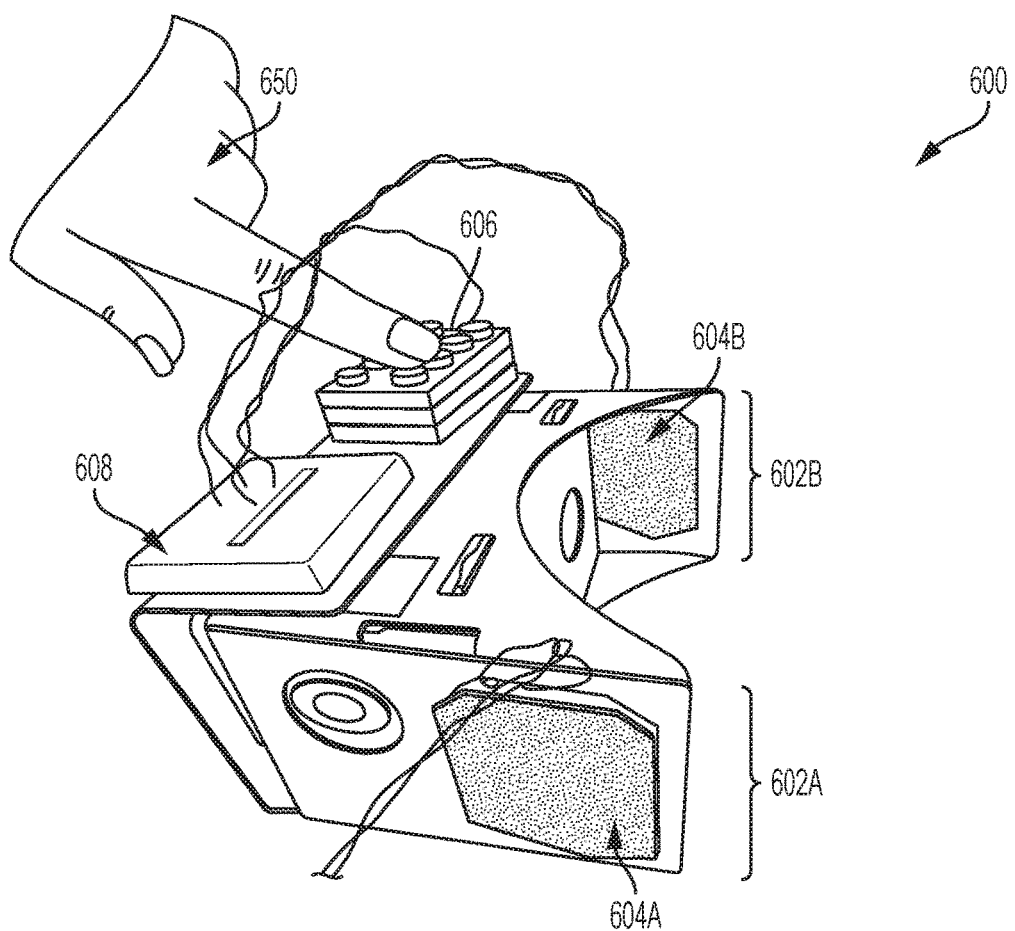

FIG. 6B illustrates the exemplary virtual reality headset 600 from FIG. 6A with panels 604 in an opaque configuration, according to some embodiments. As shown, the panels 604 to the non-opaque configuration in FIG. 6A which allows light to pass into the HMD, while the panels 604 are in an opaque configuration in FIG. 6B such that light does not pass into the HMD. The user actuates the controller 606 to change the configuration of the panels 604 by pressing a button on the controller 606 using his or her finger 650. One of skill in the art will appreciate that while FIGS. 6A-6B illustrate two panels 604 and a controller mounted to the VR headset 600, other configurations can also be used without departing from the techniques described herein.

Figure 7:
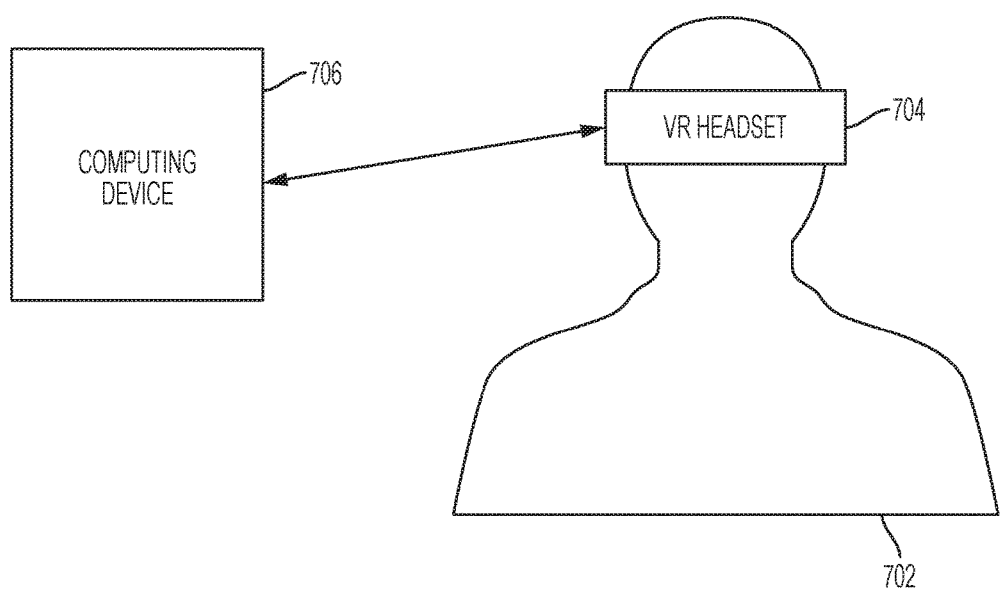
FIG. 7 illustrates an exemplary system for controlling the immersiveness of a VMR, according to some embodiments.

In addition to allowing the system user to adjust the opacity of portions of the VR headset, the techniques also provide for an application to control how much of the real world is visible from the virtual world through the panels. FIG. 7 illustrates an exemplary system 700 for controlling the immersiveness of a VMR, according to some embodiments. The system 700 includes a user 702 wearing a VR headset 704 that is in communication with a computing device 706 (e.g., the computing device 308). As explained in conjunction with FIG. 3, the computing device 706 can be in wireless or wired communication with the VR headset 704.

The computing device 706 can be configured to adjustably control one or more portions of the VR headset 704 to control how much of the real world is let into the VMR. As described herein, for example, the one or more portions of the VR headset can be one or more LCD panels that can become transparent, opaque, or anywhere in between.

For example, game designers could adjust the opacity of one or more portions of the VR headset during game play to enhance the effects of in-game content. For example, if within the game play the designer wants to shock the player by having a creature jump out when the player opens a door, the computing device 706 can adjust one or more portions of the VR headset to be slightly transparent as the player approaches the door, making the HMD less immersive by letting in more of the real world. Then, when the player opens the door, the computing device 706 can adjust the one or more panels to being totally opaque to make the HMD more immersive. In some embodiments, the adjustment of the one or more portions of the VR headset 704 can be combined with other cues, such as visual, auditory, vibration, and/or other cues used in conjunction with the event (e.g., the creature jumping out), to thereby further enhance the desired effect.

If the VR headset includes a plurality of adjustable portions (e.g., the adjustable panels 604 shown in FIGS. 6A-6B), the portions can be controlled individually, together, or some combination thereof. By allowing the computing device 706 to adjustably control different portions at different times, game and content designers can be provided with additional flexibility over the experience for the HMD user.

By controlling the opacity of one or more portions of the VR headset 704, the computing device 706 can be configured to adjust the opacity based on one or more triggers, such as the start of the VR content (e.g., to make the portions opaque), the end of the VR content (e.g., to make the portions transparent), to enhance game effects, to periodically expose the user to the real-world to counter motion sickness, and/or other triggers. For example, the computing device may start out with the one or more portions of the VR headset fully transparent, so that when the system user puts on the HMD he or she can maintain his or her orientation within the real world. Then, for example when the game's splash screen appears, the computing device may slowly transition the one or more portions of the VR headset from transparent to opaque, thereby easing him or her into complete immersion.

Figure 11A:
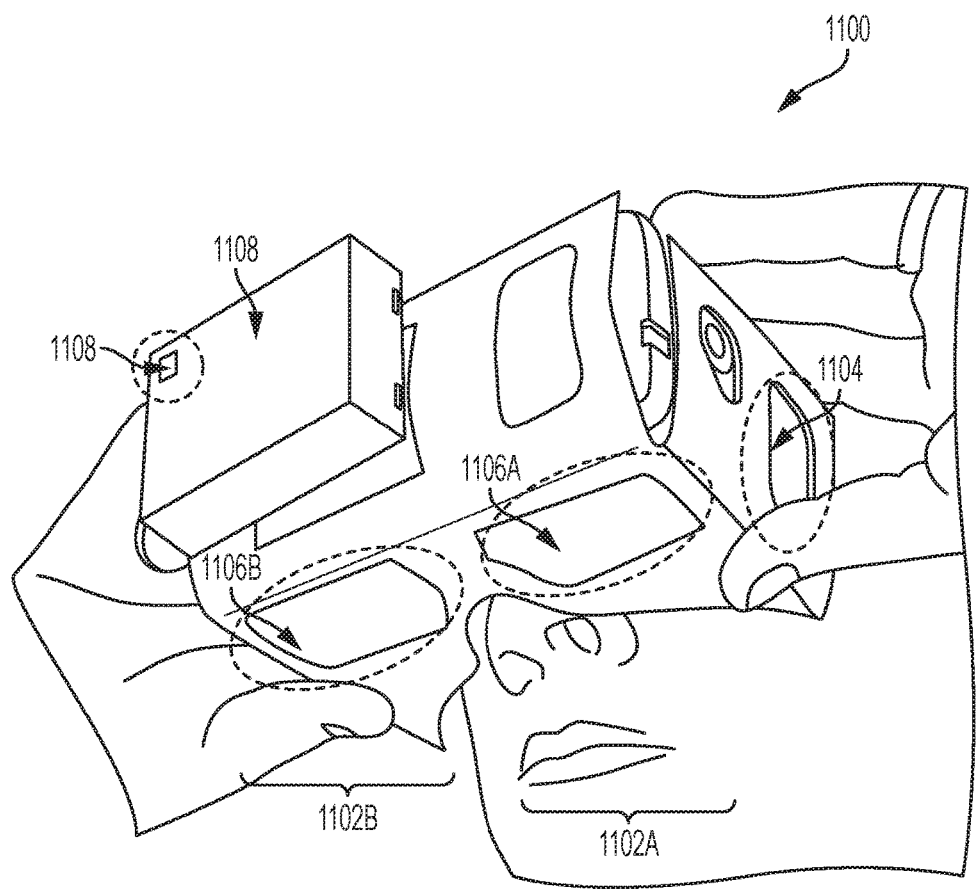
FIGS. 11A-11C illustrate an exemplary VR headset with variably transparent sides and a variably transparent bottom, according to some embodiments.

FIG. 11A illustrates an exemplary VR headset 1100 with variably transparent sides and a variably transparent bottom, according to some embodiments. The VR headset 1100 includes blinders 1102A and 1102B on the sides of the headset, which occlude the side view of the user, as well as portions of the top and bottom view of the user. The VR headset 1100 includes panel 1104 on the side of the blinder 1102A. There is also a similar panel on the side of the blinder 1102B (not shown). The VR headset 1100 includes panels 1106A and 1106B on the bottom of blinders 1102A and 1102B, respectively (collectively referred to as panels 1106). The VR headset 1100 includes a controller 1108 that is connected to each of the panels 1104 and 1106. The controller 1108 includes a switch 1110 that can vary the transparency of the panels 1104 and 1106.

Figure 11B:
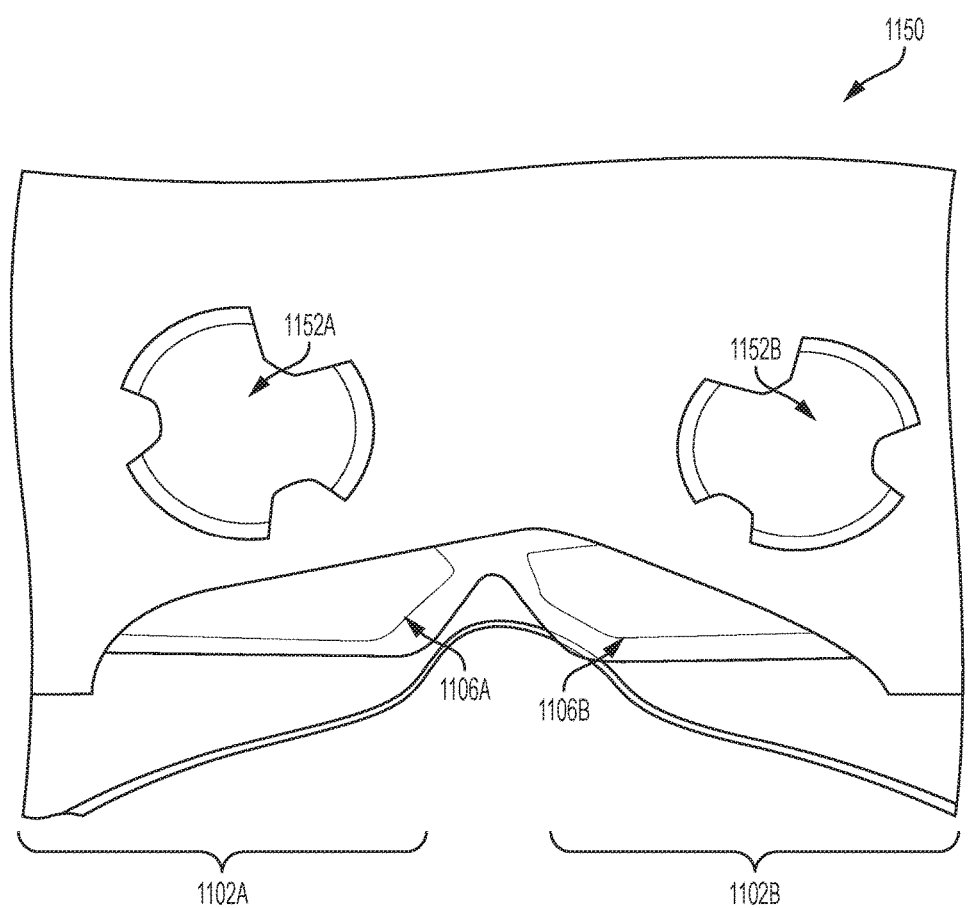
Figure 11C:
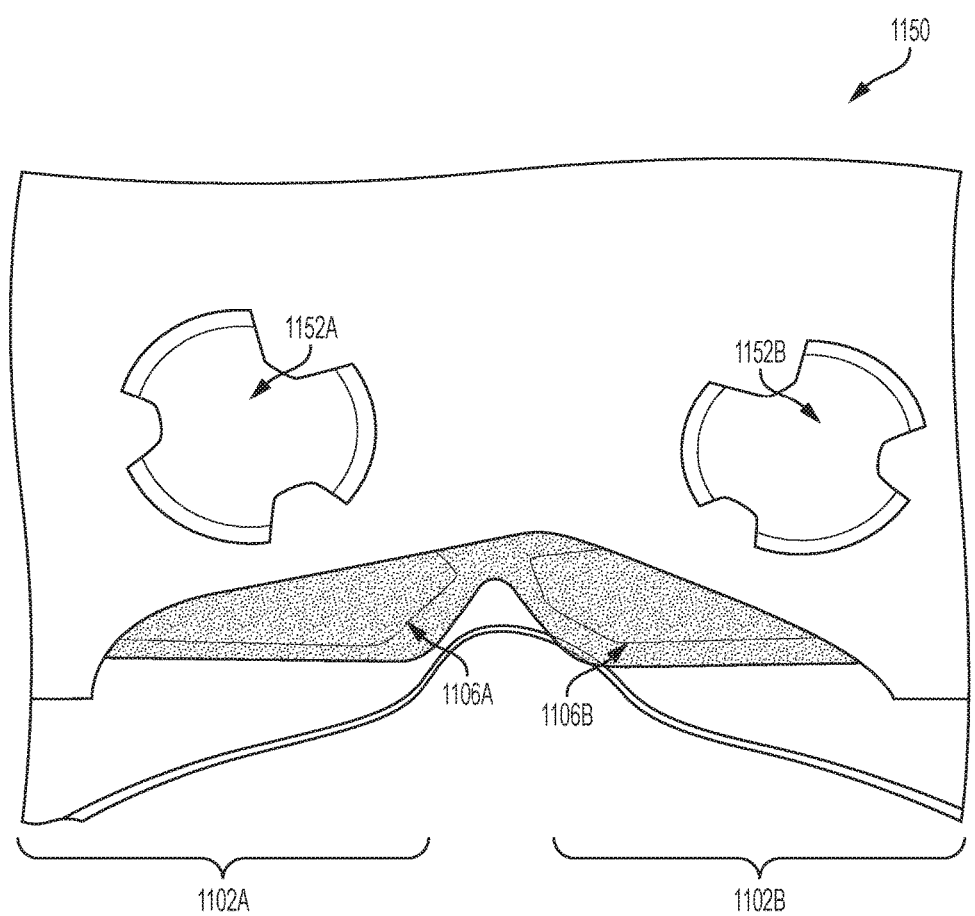

FIGS. 11B and 11C show the inside 1150 of headset 1100, including bottom portions of the blinders 1102A and 1102B and the associated panels 1106A and 1106B, respectively. The inside 1150 of headset 1100 also shows the two viewing portions 1152A and 1152B through which the user views the virtual world. FIG. 11B shows the panels 1106A and 1106B in a transparent configuration, such that the user can perceive the real world through the panels 1106A and 1106B through the bottom of the blinders 1102A and 1102B when wearing the headset 1100. FIG. 11C shows the panels 1106A and 1106B in an opaque configuration, such that the panels 1106A and 1106B block out the real world when the user is wearing the headset 1100.

The depth and frequency of nausea in system users of HMDs (the so called "cybersickness" mentioned herein) has been shown to increase with depth of immersion, due to a lack of the real-world cues the brain is often expecting. Methods for monitoring and measuring levels of cybersickness continue to be developed, and the system could include one or more devices configured to measure the level of cybersickness of the user. Based on the monitoring and cybersickness at run time, the system could increase and decrease the transparency of the LCD panels imperceptibly to maintain acceptable cybersickness levels in players. In some embodiments, the VR headset includes manual controls that also allow a user to dynamically adjust level of immersiveness (e.g., as described in conjunction with FIGS. 6A-6B) so that the user can manually counter cybersickness.

Figure 8:
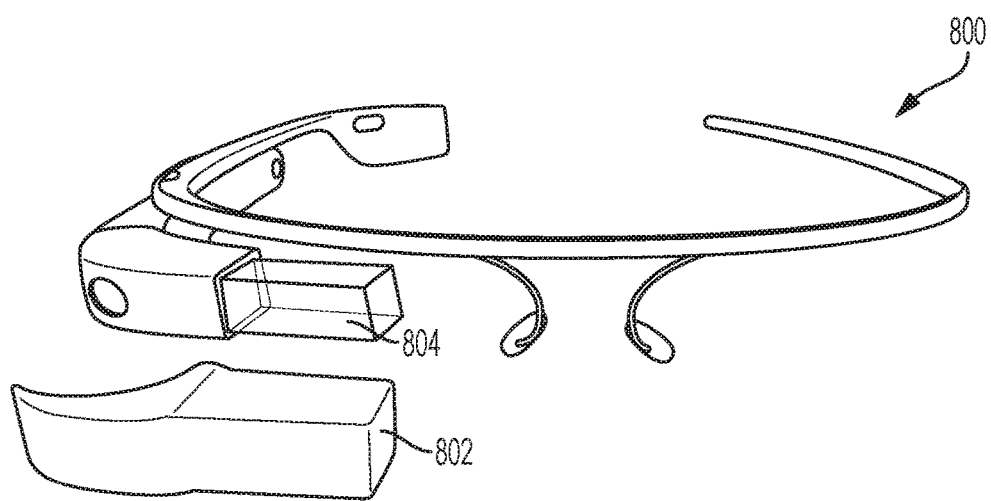
FIG. 8 is an example of an augmented reality (AR) headset.
Figure 9:
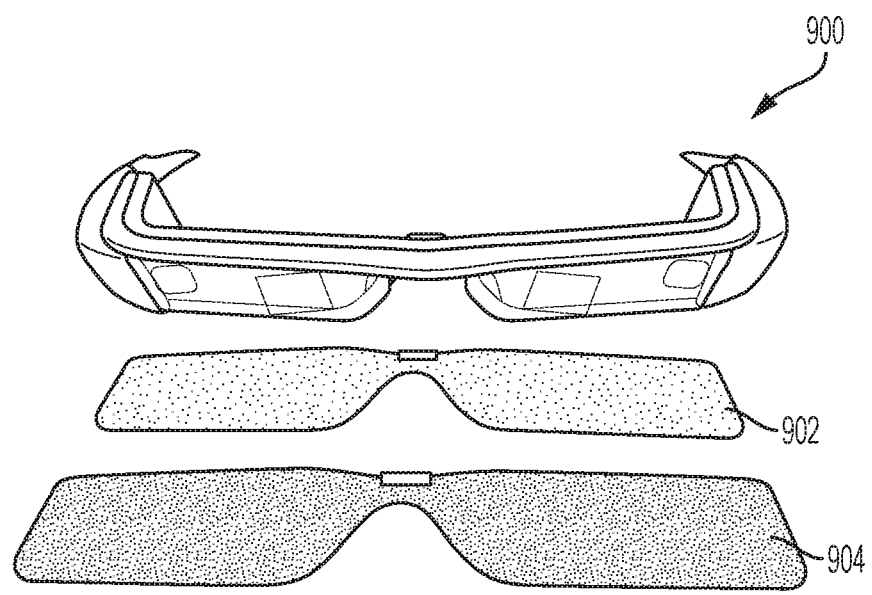
FIG. 9 is another example of an AR headset.

Augmented Reality (AR) displays attempt to merge virtual content with the real world, so that the system user sees relevant information embedded within their view of the real world. AR displays can offer a solution to make the AR display more immersive, such as by providing physical barriers (e.g., shields) that can be attached to block out some or all of the light coming from behind their displays. FIG. 8 is an example of a Google Glass AR headset 800, which includes a blocker 802 that can be placed over the viewing pane 804 to provide a more immersive experience to the user. FIG. 9 is an example of an Epson Moverio headset 900, which are smart glasses that are designed to provide augmented reality. For example, the Epson Moverio headset 900 can be used for game play experience as well as for other applications, such as flying unmanned vehicles. The headset 900 comes with removable shades 902, 904, where shade 902 is less occluded than shade 904. The user can use either shade 902 or 904 to selectively configure the transparency of the headset 900.

In some embodiments, the front of the VR headset or AR headset can be configured such that the transparency of the front can be varied to selectively expose the user to the real world through the front of the VR headset, without needing to physically add or remove shields. For example, an adjustable LCD screen can be used in VR or AR headsets to dynamically control (e.g., by the user and/or by a system in communication with the headset) how "see through" the displays are, thereby providing more options for developers. For example, in bright light, the LCD panels could be made more opaque, making the virtual content more visible. This could also be used for VR HMDs, in order to allow light from both the periphery, as well as through the display itself (e.g., the display itself could be made of an LCD panel), creating a single headset that would dynamically support usage patterns from fully immersive VR through lightweight AR.

In some embodiments, the techniques described herein for controlling a user's immersiveness (e.g., as described in conjunction with FIGS. 6A-9 and 11A-11C) can be combined with the techniques described herein for introducing real-world objects into a virtual space (e.g., as described in conjunction with FIGS. 3-5). For example, in addition to using a camera and associated techniques to introduce a real-world object into a virtual space, the panels can be made transparent, as necessary, when a user needs to first locate a real-world object (e.g., so that the user need not remove the VR headset in order to locate the real-world object). As another example, if the VR experience (e.g., with or without real-world objects introduced into the VR world) causes motion sickness, the VR headset can be configured to manually and/or automatically make one or more panels or blinders on the VR headset transparent to counter such motion sickness.

The above described techniques can be implemented in a distributed computing system that includes a back-end component, e.g., as a data server, and/or a middleware component, e.g., an application server, and/or a front-end component, e.g., a client computer or game console having a graphical player interface through which a player can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing/gaming system can include clients and servers or hosts. A client and server (or host) are generally remote from each other and typically interact through a communication network. The relationship of client and server arises by virtue of computer programs running on the respective computers and having a client-server relationship to each other.

Those of skill in the art would appreciate that various illustrations described herein may be implemented as electronic hardware, computer software, firmware, or combinations of two or more of electronic hardware, computer software, and firmware. To illustrate this interchangeability of hardware, software, and/or firmware, various illustrative blocks, modules, elements, components, methods, and algorithms have been described above generally in terms of their functionality. Whether such functionality is implemented as hardware, software, firmware, or a combination depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology. An implementation of the disclosed subject matter can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The disclosed subject matter can also be embedded in a computer program product, which comprises all the features enabling the implementation of the methods and systems described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, the systems and methods described herein may also be embodied in other specific forms without departing from the spirit or essential attributes thereof, and accordingly, reference should be had to the following claims, rather than to the foregoing specification, as indicating the scope of the systems and methods.

The present disclosure has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A virtual-reality headset, comprising:
a front viewing portion, configured to be disposed in front of a system user's eyes when the system user wears the virtual-reality headset;
at least one side portion, configured to be disposed at a side view of the system user when the system user wears the virtual-reality headset;
at least one panel on the virtual reality headset disposed on the at least one side portion, with the at least one panel being capable of being adjusted to increase or decrease opacity of the panel; and
a control device in communication with the at least one panel, with the control device being capable of adjusting the opacity of the at least one panel in response to a command to increase or decrease the opacity of the panel, and with the control device including at least one of a computer-based control device or an electrical control device,
whereby the system user's immersiveness in the virtual world displayed by the virtual-reality headset is capable of being automatically controlled while the system user wears the virtual-reality headset.

2. The virtual-reality headset of claim 1, wherein the at least one panel disposed on the at least one side portion comprises:
a first panel disposed on a first side of the virtual-reality headset, wherein the first side portion is selected from the group consisting of a first left side portion, a first bottom side portion, and a first top side portion; and
a second panel disposed on a second side of the virtual-reality headset, wherein the second side portion is selected from the group consisting of a second left side portion, a second bottom side portion, and a second top side portion.

3. The virtual-reality headset of claim 2, wherein each of the first and second panels can be controlled individually, simultaneously, or any combination thereof.

4. The virtual-reality headset of claim 1, wherein the at least one panel is a liquid crystal display panel that can be adjusted to control the opacity of the panel.

5. The virtual-reality headset of claim 1, wherein the control device is disposed on the virtual reality headset so that the system user can manually adjust the opacity of the at least one panel.

6. The virtual-reality headset of claim 1, wherein the control device is a computing device located remote from the virtual-reality headset so that the control device can automatically control the headset based on one or more preconfigured triggers.

7. A computerized method for controlling a system user's immersiveness in a virtual world displayed by a virtual-reality headset, the computerized method being stored in machine-readable instructions that, when executed by a processor, cause the processor to:
receive an instruction to adjust the opacity of at least one panel on the virtual reality headset, the at least one panel being capable of being adjusted to increase or decrease opacity of the panel, wherein the virtual reality headset comprises:
a front viewing portion, configured to be disposed in front of a system user's eyes when the system user wears the virtual-reality headset;
at least one side portion, configured to be disposed at a side view of the system user when the system user wears the virtual-reality headset; and
the at least one panel is disposed on the at least one side portion;
adjust the opacity of the at least one panel in response to the instruction, whereby the system user's immersiveness in the virtual world displayed by the virtual-reality headset is automatically controlled while the system user wears the virtual-reality headset.

8. The computerized method of claim 7, wherein:
the instruction comprises an instruction to increase the opacity of the at least one panel, an instruction to decrease the opacity of the at least one panel, or both; and
adjusting the opacity of the at least one panel comprises increasing the opacity of the at least one panel, decreasing the opacity of the at least one panel, or both, in response to the instruction.

9. The computerized method of claim 7, further comprising receiving the instruction from a computing device located remote from the virtual-reality headset so that the control device can automatically control the headset based on one or more preconfigured triggers.

10. The computerized method of claim 7, further comprising receiving the instruction from a control device disposed on the virtual reality headset so that the system user can manually adjust the opacity of the at least one panel.

11. The computerized method of claim 7, wherein:
the at least one panel disposed on the at least one side portion comprises:
a first panel disposed on a first side of the virtual-reality headset, wherein the first side portion is selected from the group consisting of a first left side portion, a first bottom side portion, and a first top side portion; and
a second panel disposed on a second side of the virtual-reality headset, wherein the second side portion is selected from the group consisting of a second left side portion, a second bottom side portion, and a second top side portion; and
adjusting the opacity of the at least one panel comprises controlling each of the first and second panels individually, simultaneously, or any combination thereof.

12. A non-transitory computer readable medium having executable instructions operable to cause an apparatus to:
receive an instruction to adjust the opacity of at least one panel on a virtual-reality headset, the at least one panel being capable of being adjusted to increase or decrease opacity of the panel, wherein the virtual reality headset comprises:
a front viewing portion, configured to be disposed in front of a system user's eyes when the system user wears the virtual-reality headset;
at least one side portion, configured to be disposed at a side view of the system user when the system user wears the virtual-reality headset; and
the at least one panel is disposed on the at least one side portion; and
adjust the opacity of the at least one panel in response to the instruction, whereby a system user's immersiveness in a virtual world displayed by the virtual-reality headset is automatically controlled while the system user wears the virtual-reality headset.

13. The non-transitory computer readable medium of claim 12, wherein:
the instruction comprises an instruction to increase the opacity of the at least one panel, an instruction to decrease the opacity of the at least one panel, or both; and
adjusting the opacity of the at least one panel comprises increasing the opacity of the at least one panel, decreasing the opacity of the at least one panel, or both, in response to the instruction.

14. The non-transitory computer readable medium of claim 12, wherein the instructions are further operable to cause the apparatus to receive the instruction from a computing device located remote from the virtual-reality headset so that the control device can automatically control the headset based on one or more preconfigured triggers.

15. The non-transitory computer readable medium of claim 12, wherein the instructions are further operable to cause the apparatus to receive the instruction from a control device disposed on the virtual reality headset so that the system user can manually adjust the opacity of the at least one panel.

16. The non-transitory computer readable medium of claim 12, wherein:
the at least one panel disposed on the at least one side portion comprises:
a first panel disposed on a first side of the virtual-reality headset, wherein the first side portion is selected from the group consisting of a first left side portion, a first bottom side portion, and a first top side portion; and
a second panel disposed on a second side of the virtual-reality headset, wherein the second side portion is selected from the group consisting of a second left side portion, a second bottom side portion, and a second top side portion; and
adjusting the opacity of the at least one panel comprises controlling each of the first and second panels individually, simultaneously, or any combination thereof.

* * * * *